UNITED STATES PATENT OFFICE.

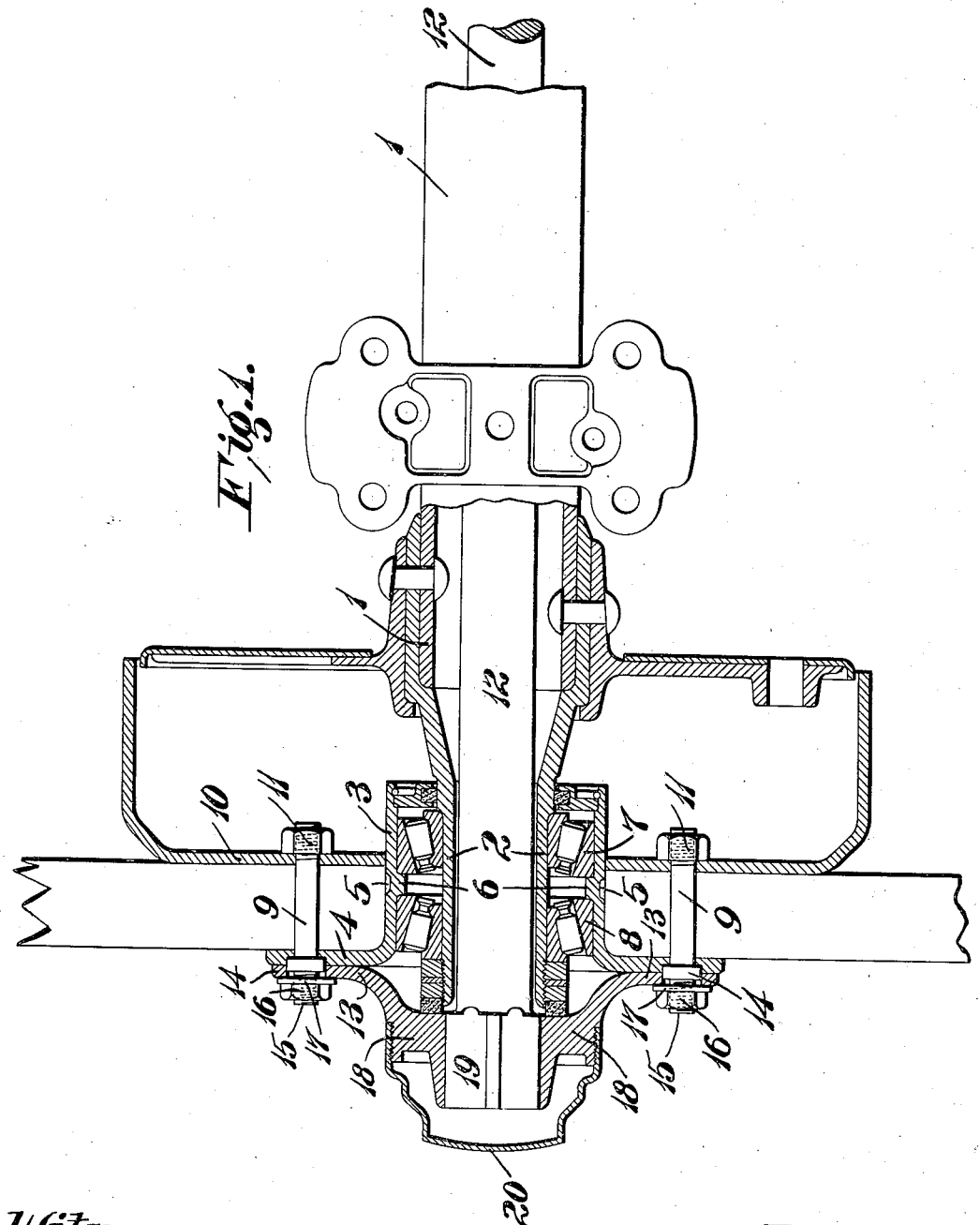

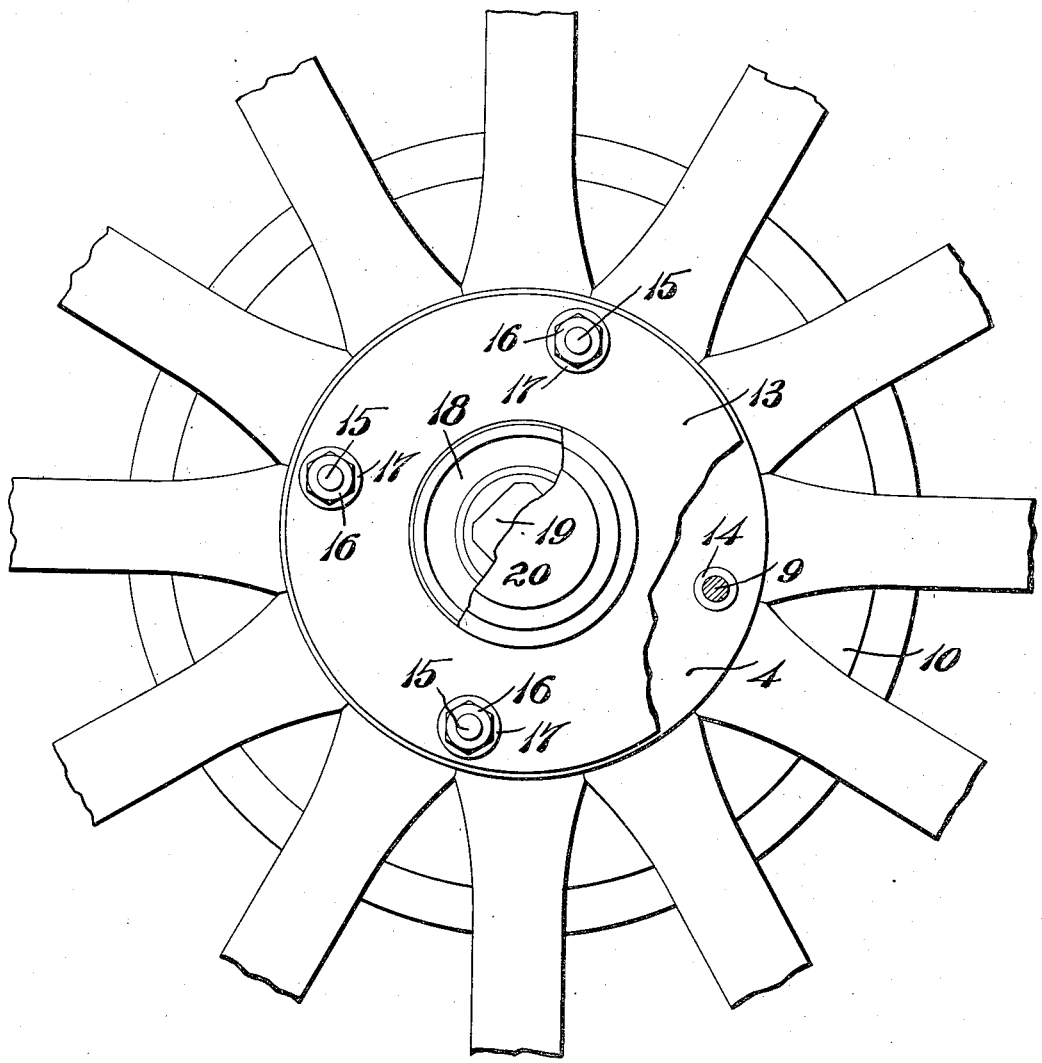

HERBERT W. ALDEN, OF DETROIT, MICHIGAN, ASSIGNOR TO THE TIMKEN DETROIT AXLE COMPANY, OF DETROIT, MICHIGAN, A CORPORATION OF MICHIGAN.

DRIVING-AXLE.

1,007,260.     Specification of Letters Patent.      Patented Oct. 31, 1911.

Application filed July 15, 1910. Serial No. 572,089.

*To all whom it may concern:*

Be it known that I, HERBERT W. ALDEN, a citizen of the United States, and a resident of the city of Detroit, in the county of Wayne and State of Michigan, have invented a new and useful Improvement in Driving-Axles, of which the following is a specification.

The subject-matter of this invention is divided out of an application for Letters Patent for axles, filed by me on March 31, 1910, Serial No. 552,547.

The invention relates to driving mechanism for motor vehicles and the like, and it has for its principal objects to secure a simple and efficient construction, and to attain certain advantages hereinafter more fully appearing.

The invention consists in the parts and in the arrangements and combinations of parts hereinafter described and claimed.

In the accompanying drawings which form part of this specification and wherein like symbols refer to like parts wherever they occur, Figure 1 is a fragmentary view, partly in top plan and partly in horizontal section, of the end portion of a driving axle and wheel hub journaled thereon; and Fig. 2 is a fragmentary end view.

In the drawings, one end portion of a hollow axle casing or tube 1 is shown. On the end of the axle 1 is a tubular spindle extension 2 on which the wheel hub is journaled.

The hub of the wheel comprises a steel stamping with a tubular barrel portion 3 and flanged outer end portion 4. At the middle portion of the tubular barrel 3 are depressions 5, preferably four of them, which are arranged at diametrically opposite points in annular alinement. These depressions form lugs or projections 6 on the inside of the barrel which provide stops or seats for the outer bearing rings 7, 8, respectively. This construction permits of the use of thin metal with very little taken off for finish and still gives a multiplicity of good seating points or stops for each bearing cup or ring. The annular flange portion 4 is perforated at intervals to receive securing bolts or studs 9 which are screw-threaded at their inner ends and projected through the spokes and also through perforations in the brake drum 10 or a separate clamping plate, as the case may be, and provided with nuts 11 whereby the hub, spokes and the brake drum are clamped together.

The outer end portion of the driving shaft 12 (see Figs. 1 and 2) is brought through the hollow extension 2 on the end of the axle tube 1 and a driving plate 13 is rigidly attached to the shaft. This driving plate 13 is preferably circular and covers practically the entire outer surface of the hub flange 4 and it is connected to the same, preferably, by certain of the studs or bolts 9. Any suitable or desirable number of the studs 9 may be employed, but preferably four of them are arranged substantially as shown. That is, they are provided with shoulders or collars 14 and have threaded outer end portions 15 on which are fitted nuts 16 with interposed washers 17. As shown in the drawing, it is preferable to counterbore the bolt holes in the flange of the hub and in the driving plate, in order that the flange and the driving plate may abut flatwise and in order also to secure the bolts more rigidly. By this arrangement, the driving plate 13 may be readily detached without necessitating the removal of the bolts 9 from the wheel. The central portion of the plate 13 is cupped so as to provide an outwardly projecting hub portion 18. The metal of this hub portion 18 is preferably somewhat thicker than the plate portion 13 and it is provided with a central opening which is a counterpart of the squared or polygonal end portion 19 of the driving shaft 12. By this arrangement, the power is transmitted through the driving shaft direct to the wheel hub. A suitable protecting cover or cap 20 is secured on the hub portion 18 of the driving plate inclosing the end portion of the driving shaft 12 to prevent the latter being withdrawn from its engagement with the central opening in the hub of the driving plate, and to prevent the entrance of dirt within the hub or the escape of lubricating oil therefrom. It is, of course, understood that the opposite ends of the axle casing are similarly arranged and that the driving shaft 12 is usually made in two sections whose inner ends are connected to a differential gear which is in turn connected with the motor. Such arrangement being obvious, the same is not illustrated in the drawings.

Obviously, the device admits of considerable modification without departing from my invention. Therefore, I do not wish to be limited to the specific construction and arrangement shown.

What I claim is:

1. The combination with a tubular axle, of a driving shaft rotatably mounted therein and having a polygonal end portion, a wheel hub rotatably mounted on the end portion of said axle and comprising a barrel portion having at its outer end an annular flange wide enough to constitute a spoke clamping plate, a brake drum plate, spokes between said flange and said brake drum plate, a driving plate abutting flatwise against said flange and having a hub portion provided with an axial perforation fitting over the end portion of the shaft, and bolts threaded at both ends and provided with collars, said bolts extending through said brake drum plate, said flange and said driving plate at a distance from said barrel and with their collars between said flange and said driving plate, whereby the driving plate may be dismounted without affecting the spokes.

2. The combination with a tubular axle, of a driving shaft rotatably mounted therein, a wheel hub rotatably mounted on the end portion of said axle and comprising a barrel portion having inwardly extending projections on its inner surface in annular alinement to constitute stops for bearing rings and having at its outer end an annular flange wide enough to constitute a spoke clamping plate, a brake drum plate, spokes between said flange and said brake drum plate, a driving plate abutting flatwise against said flange and having interlocking engagement with said driving shaft, and bolts threaded at both ends and provided with collars, said bolts extending through said brake drum plate, said flange and said driving plate being counterbored to receive said collars.

3. The combination with a tubular axle, of a driving shaft rotatably mounted therein, a wheel hub rotatably mounted on the end portion of said axle and comprising a barrel portion having at its outer end an annular flange wide enough to constitute a spoke clamping plate, a brake drum plate, spokes between said flange and said brake drum plate, a driving plate abutting flatwise against said flange and having interlocking engagement with said driving shaft, and bolts threaded at both ends and provided with collars, said bolts extending through said brake drum plate, said flange and said driving plate being counterbored to receive said collars, and a washer surrounding said shaft between said driving plate and end portion of said hollow axle.

Signed at Detroit, Michigan, this 11th day of July, 1910.

HERBERT W. ALDEN.

Witnesses:
VERA MILLIKEN,
HARVY WEDLAKE.